(12) United States Patent
Albert et al.

(10) Patent No.: US 6,222,120 B1
(45) Date of Patent: Apr. 24, 2001

(54) ACCESSORY FOR ELECTRICAL WIRING CONDUIT

(75) Inventors: Christophe Albert, Pont Sainte Maxence; Robert Portier, Fleurines, both of (FR)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/167,675

(22) Filed: Oct. 7, 1998

(30) Foreign Application Priority Data

Oct. 9, 1997 (FR) .................................................. 97 12593

(51) Int. Cl.[7] ........................................................ H02G 3/04
(52) U.S. Cl. ............................ 174/48; 174/68.1; 220/4.02
(58) Field of Search ................................... 174/48, 49, 50, 174/52.1, 58, 63, 64, 68.3, 68.1, 95, 97, 88 R; 52/220.1, 220.7, 220.8; 220/3.3, 3.9, 4.02

(56) References Cited

U.S. PATENT DOCUMENTS

| | | | |
|---|---|---|---|
| 3,262,083 | * | 7/1966 | Gooding ................................. 439/216 |
| 3,721,762 | * | 3/1973 | Gooding .................................. 174/48 |
| 3,786,171 | * | 1/1974 | Shira ....................................... 114/48 |
| 3,938,767 | * | 2/1976 | Norris ..................................... 248/58 |
| 5,134,250 | * | 7/1992 | Caveney et al. ...................... 174/101 |
| 5,235,136 | * | 8/1993 | Santucci et al. ..................... 174/68.3 |
| 5,435,606 | * | 7/1995 | Navazo .............................. 285/149.1 |
| 5,523,529 | * | 6/1996 | Holliday ................................ 174/101 |
| 5,591,938 | * | 1/1997 | Navazo ................................... 174/50 |
| 5,869,786 | * | 2/1999 | Jaakkola et al. ........................ 174/96 |

FOREIGN PATENT DOCUMENTS 0518404  12/1992  (EP) .
2311419   9/1997  (GB) .

* cited by examiner

Primary Examiner—Dean A. Reichard
Assistant Examiner—Dhiru R Patel
(74) Attorney, Agent, or Firm—Browdy and Neimark

(57) ABSTRACT

An electrical wiring channel section covering accessory, for example an end-piece, has a covering part nesting over the channel section with ribs on the inside able to become embedded in a flange of the channel section, in particular in a bead thereon.

13 Claims, 2 Drawing Sheets

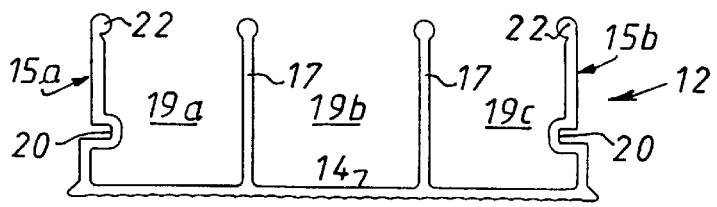
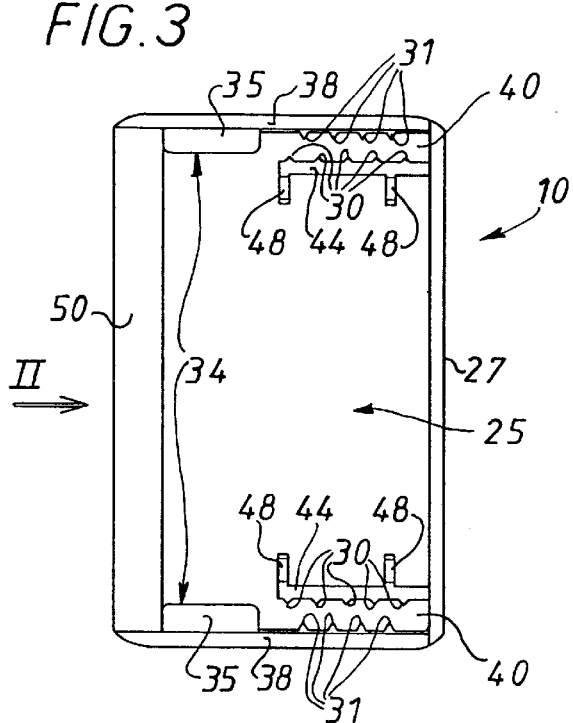
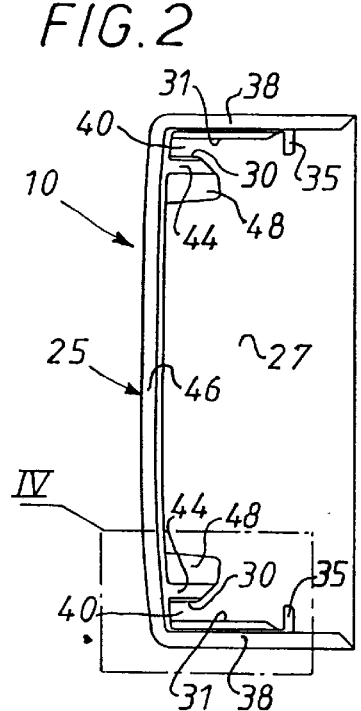
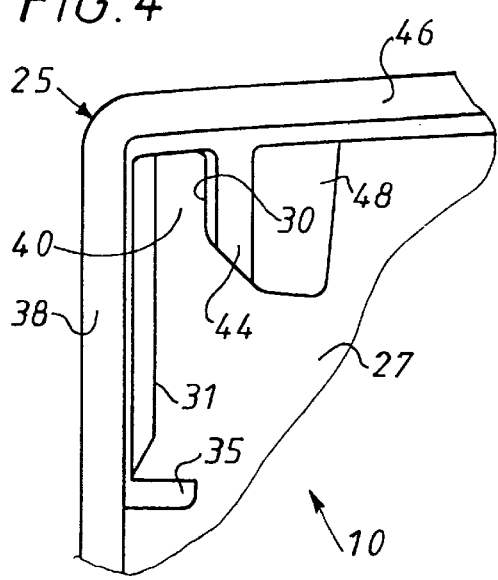
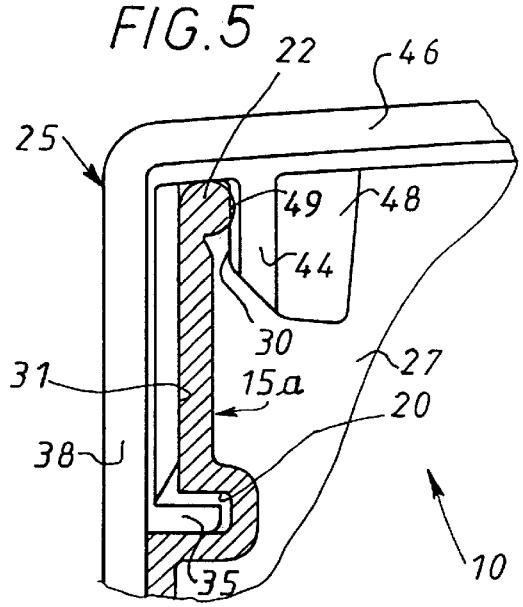

ACCESSORY FOR ELECTRICAL WIRING CONDUIT

BACKGROUND OF THE INVENTION

1. Field of the Invention

The invention concerns an accessory for electrical wiring conduit, typically a conduit comprising a channel section made of a relatively soft semi-rigid material, for example an extruded plastics material; the invention is more particularly concerned with an accessory that is useful or necessary at certain locations on the conduit and can be mounted on and fixed to the channel section automatically "from the front" without using any additional fixing means implying the use of glue or screws, for example.

In terms of its application, the accessory may consist in a conduit end-piece intended to close off the end of a conduit, a conduit cover joint for covering two adjacent ends of two lengths of a section constituting the cover of the channel section or a conduit corner covering device used at locations where the conduit changes direction.

2. Description of the Prior Art

In the remainder of the description the accessory to which the description more particularly applies is an end-piece adapted to be fixed to one end of a conduit of the above kind. One end-piece of the above type for closing off the end of a conduit when wiring is completed known in itself is shaped and sized to engage axially within the conduit consisting of the channel section and its cover. To resist impacts and other loads the accessory is screwed or glued to the wall and/or to the conduit. It must be engaged from the end.

In the most usual situation the cover is fitted after fixing the end-piece. In the case of a cover end-piece, the cover must be engaged under the end-piece before it is clipped to the back. If the end of the conduit is near a corner, mounting is complicated because the end-piece must be fixed to the back of the conduit before fixing the back to the wall.

The invention avoids these complicated and tiresome operations by proposing an accessory (typically an end-piece) that can be mounted from the front, i.e. in a direction perpendicular to the axis of the conduit and fixed and immobilized by simple forcible nesting perpendicular to the longitudinal direction of said channel section.

SUMMARY OF THE INVENTION

To be more precise, the invention consists in an electrical wiring conduit accessory, said conduit including a channel section made of a relatively soft material, for example an extruded plastics material, having a back in the form of a strip and two longitudinal flanges extending from respective edges of said strip, which accessory includes a covering part shaped and sized to be able to cap a portion of a channel section of the above kind by nesting over it and said covering part includes internally at least one lateral groove defined and located so that one of the aforementioned flanges of said channel section engages therein during mounting of said accessory, said lateral groove containing relatively sharp ribs adapted to be become embedded in at least one flange of a channel section of the above kind during mounting of said accessory perpendicularly to the longitudinal direction of said channel section.

With an arrangement of the above kind the accessory mounted by forcible engagement on the channel section is immediately immobilized in the longitudinal direction by notching of the edges thereof. The accessory further includes clipping means cooperating with structural elements of said channel section to immobilize it transversely to the longitudinal direction of the channel section. The aforementioned structural elements can be longitudinal grooves opening externally on the flanges of the channel section and often intended for mounting the cover. In this case the cover is cut shorter and the accessory nests over the channel section, covering it over a certain distance.

The accessory advantageously includes two such parallel lateral grooves adapted to cooperate with respective parallel flanges of the channel section.

The channel section conventionally includes a bead, for example a cylindrical bead, on the edge of each longitudinal flange. The sharp ribs formed in the aforementioned lateral groove or grooves can make cuts, preferably in the beads, upon forcible mounting of the accessory perpendicular to the longitudinal direction of the channel section.

The invention will be more clearly understood and other advantages of the invention will become more clearly apparent from the following description of an accessory in accordance with the invention given by way of example only and with reference to the accompanying drawings.

BRIEF DESCRIPTION OF THE DRAWINGS

FIG. 1 is a cross-sectional view of a channel section of an electrical wiring conduit adapted to receive an accessory in accordance with the invention.

FIG. 2 is an elevation view as seen in the direction o the arrow II in FIG. 3 of an end-piece accessory in accordance with the invention.

FIG. 3 is a bottom view of the accessory.

FIG. 4 is a view to a larger scale of the detail IV from FIG. 2 showing the structure of a groove in said accessory.

FIG. 5 is a detail view analogous to FIG. 4 showing the mounting of the accessory on the channel section.

DETAILED DESCRIPTION OF THE PREFERRED EMBODIMENT

Figure 6:
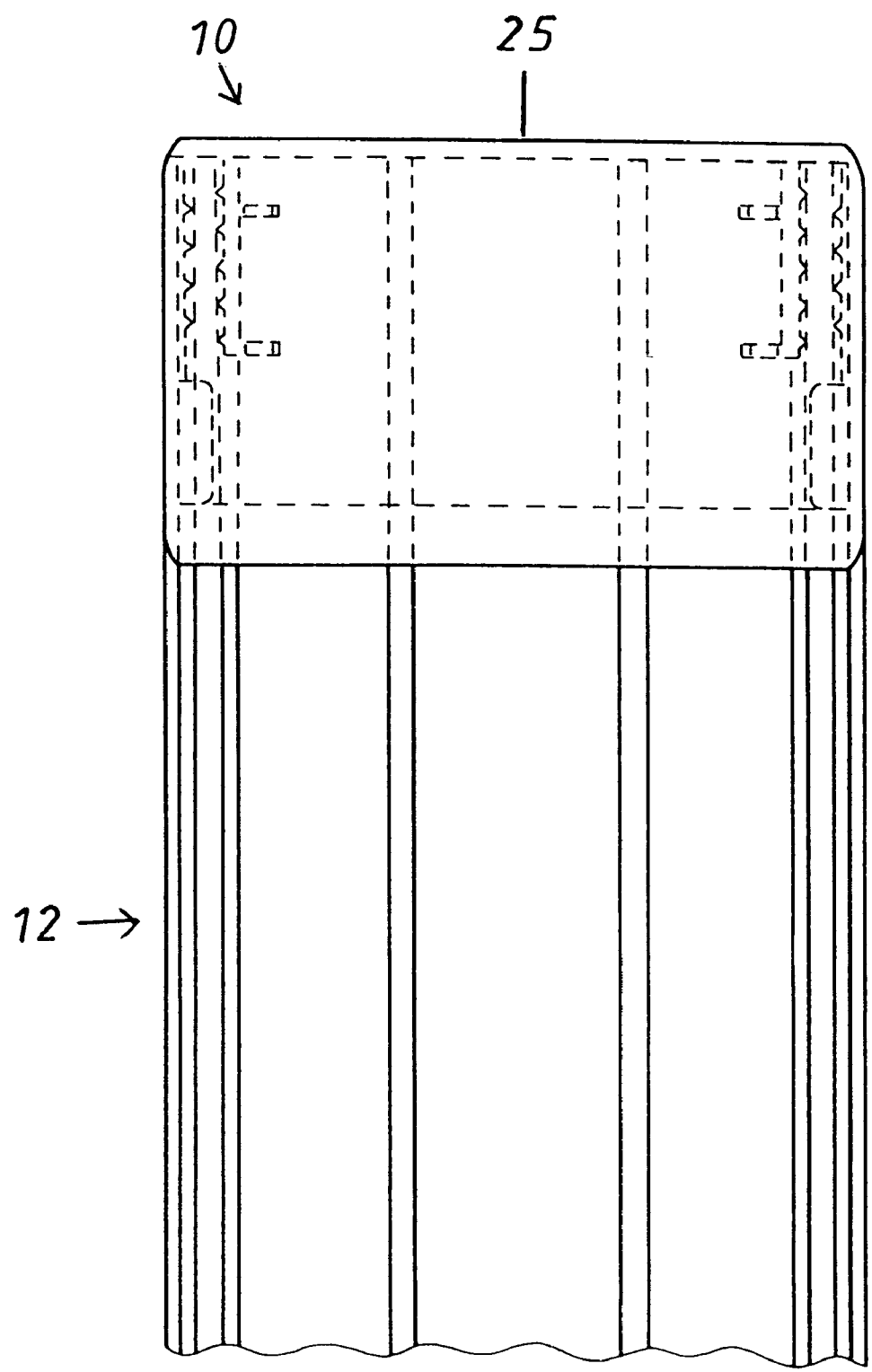
FIG. 6 is a top plan view showing a portion of the channel section shown in FIG. 1 and an accessory according to the invention covering an end of the channel section.

The wiring conduit accessory 10 shown constitutes an end-piece intended to be mounted at the end of an electrical wiring conduit to close it off on completion of wiring as shown in FIG. 6. The conduit conventionally comprises a channel section 12 as shown in FIG. 1 and a cover. The channel section is made from an extruded plastics material, i.e. a relatively soft material. It has a back 14 constituting a flat strip adapted to be fixed to a wall and two longitudinal flanges 15a, 15b extending substantially parallel to each other along edges of the aforementioned strip and respectively attached thereto. Two other longitudinal partitions 17 extend perpendicular to the strip, inside the section, to define three parallel wiring paths 19a–19c. The flanges 15a, 15b of the channel section have longitudinal grooves 20 open outwards. These grooves are normally used to mount the cover by forcibly clipping it into place. The cover is conventional and does not form any part of the invention. For this reason it is not shown. Also, the edge of each longitudinal flange 15a, 15b incorporates a bead 22, for example a substantially cylindrical bead. As explained below, these two beads are more particularly exploited to immobilize the accessory.

Regardless of its function, the accessory includes a covering part 25 shaped and sized to cap a portion of a channel section 12 of the above kind by fitting over it. Being an end-piece in the present instance, the accessory includes only one such covering part 25 with a generally U-shape profile closed at one end by a transverse wall 27 the function of which is to close off the end of an electrical wiring conduit consisting of a channel section and its cover. On the side opposite the wall 27 said covering part includes a thinner border 50 on the inside and in the form of a strip.

In accordance with one important feature of the invention, the covering part 25 includes relatively sharp ribs 30, 31 on the inside adapted to bite into the flanges of the channel section when the accessory is forcibly fitted perpendicular to the longitudinal direction of the channel section.

As explained below, the ribs 30, 31 primarily assure longitudinal immobilization of the accessory 10 relative to the conduit. The accessory also includes clipping means 34 cooperating with structural elements of said channel section to immobilize it transversely to the longitudinal direction of the channel section. Accordingly, the combination of the ribs 30, 31, on the one hand, and the clipping means 34, on the other hand, enables complete immobilization of the accessory on the channel section by simple forcible nesting upon mounting "from the front", i.e. not necessitating insertion of any part of the accessory longitudinally into the conduit.

The aforementioned clipping means 34 here comprise two parallel lugs 35 projecting laterally from the inside of the lateral walls 38 of said covering part 25, to be more precise two parallel walls of the latter. The lugs are shaped, sized and located on the inside of the covering part so that they can engage in the longitudinal grooves 20 of the channel section 12 when the accessory is mounted by forcible nesting.

The covering part 25 additionally has at least one and preferably two lateral grooves 40 on the inside defined and located near parallel walls 38 of said covering part and inside the latter so that an aforementioned flange 15a, 15b of the channel section engages in each lateral groove 40 when the accessory is fitted. The aforementioned sharp ribs 30, 31 are formed inside each lateral groove 40.

As shown clearly in the drawings, the two parallel lateral grooves are designed to cooperate with the respective flanges of the channel section. Each groove 40 is formed along an inside face of one of the two parallel walls 38 of said covering part. The groove is defined between said inside face and a partition 44 parallel thereto and projecting inwardly from a wall 46 substantially perpendicular to the two parallel walls 38, the wall 46 taking up a position over the channel section, in place of the cover. The sharp ribs 30, 31 extend substantially perpendicular to the wall 46 of the accessory along the inside faces of the two walls 38 and along the facing faces of the adjacent partitions 44. Each partition 44 is stiffened by molded-in reinforcements 48 outside the groove. The aforementioned reinforcements are attached both to the partition 44 and to the wall 46 of the covering part. The sharp ribs 31 defined on each inside face of a wall 38 extend beyond the adjacent lateral groove 40, substantially as far as the lug 35 of the clipping means.

As can be seen in the drawings, the edges of the ribs 31 carried by the inside face of a wall 38 and those of the ribs 30 carried by the adjoining partition 44 are in two parallel planes the distance between which is less than the thickness of a bead 22 of the channel section for which the accessory is designed. As a result it is primarily along the bead 22 that the edges of the ribs (most importantly those of the ribs 30) make notches 49 when the accessory is nested on the channel section.

When the user wishes to fix an accessory of the above kind forming a conduit end-piece it is sufficient to cut the cover slightly inboard in the longitudinal direction of the end of the channel section 12, by an amount less than the length of said covering part 25, and so that the cut edge of the cover faces the border 50, and to nest said accessory forcibly over the end of the channel section. The first consequence of this action is to embed the aforementioned sharp ribs 30, 31 in the parallel walls of the channel section and more particularly in the beads 22 defined along the edges thereof, to immobilize the accessory longitudinally relative to the channel section. Then, at the end of their travel, the lugs 35 engage in the longitudinal grooves 20, the consequence of which is to immobilize the accessory transversely to the longitudinal direction of the conduit. Because of this, said accessory is completely immobilized on the channel section without using additional fixing means such as glue or screws.

Of course, the invention is not limited to the embodiment of the accessory that has just been described. The accessory can have very different shapes dictated by its function. In particular, the principle of locking the accessory onto the channel section can be used in a conduit cover joint, i.e. in a part designed to connect two portions of cover nested end-to-end on the same channel section, or in a conduit corner covering device.

There is claimed:

1. An electrical wiring conduit accessory for covering a channel section of an electrical wiring conduit, the channel section being made of a relatively soft material and having a back in the form of a strip with two opposed edges extending in a longitudinal direction and two longitudinal flanges extending from respective edges of the strip, said accessory comprising a covering part configured and dimensioned to cap a portion of the channel section by nesting over the portion of the channel section, said covering part having members forming at least one groove internally of said covering part, said at least one groove being located to be engaged by one of the flanges when said covering part caps the channel section portion, wherein said members have sharp ribs extending into said at least one groove and configured and located to become embedded in the one of the flanges during mounting of said accessory on the channel section by movement perpendicular to the longitudinal direction.

2. An accessory as claimed in claim 1 constituting an electrical wiring end-piece.

3. An accessory as claimed in claim 1 constituting a conduit cover joint.

4. An accessory as claimed in claim 1 constituting a conduit corner covering device.

5. The accessory claimed in claim 1 wherein said covering part includes a thin border.

6. The accessory of claim 1 further including clipping means cooperating with the channel section to immobilize the channel section transversely to the longitudinal direction of the channel section.

7. The accessory claimed in claim 6 wherein the flanges of the channel section are provided with outwardly open longitudinal grooves and said clipping means comprise two parallel lugs projecting laterally and inwardly from walls of said covering part, said lugs being shaped, sized and located to be able to engage in said longitudinal grooves during forcible mounting of said accessory.

8. The accessory as claimed in claim 1 wherein said at least one groove is constituted by two grooves each adapted to be engaged by a respective one of the longitudinal flanges.

9. The accessory of claim 1 wherein said members of said covering part include two substantially parallel walls and one of said two walls has an inside face which delimits one side of said at least one groove.

10. The accessory of claim 9 wherein said covering part has a second wall substantially perpendicular to said two walls and said members of said covering part further include a partition projecting from said second wall and extending parallel to said one of said two walls, said at least one groove being defined between said partition and said inside face of said one of said two walls.

11. The accessory of claim 10 wherein said partition has a face which delimits a second side of said at least one groove, said sharp ribs are provided on said inside face of said one of said two walls and said face of said partition, and all of said ribs are parallel to one another.

12. The accessory of claim 11 wherein each of said longitudinal flanges of the channel section has a bead having a thickness, each of said ribs has an edge, edges of said ribs on said inside face of said one of said two walls lie in a first plane and said edges of said ribs on said face of said partition lie in a second plane that is spaced from said first plane by a distance which is less than the thickness of each said bead.

13. The accessory claimed in claim 10 wherein said partition is stiffened by molded-in reinforcements outside said at least one groove.

* * * * *